United States Patent [19]

Schepp

[11] Patent Number: 4,878,769
[45] Date of Patent: Nov. 7, 1989

[54] CENTER-FREE ROLLER BEARING

[75] Inventor: Martin Schepp, Schweinfurt, Fed. Rep. of Germany

[73] Assignee: SKF GmbH, Fed. Rep. of Germany

[21] Appl. No.: 248,736

[22] Filed: Sep. 26, 1988

[30] Foreign Application Priority Data

Oct. 3, 1987 [DE] Fed. Rep. of Germany ....... 8713304

[51] Int. Cl.$^4$ .................... F16C 19/34; F16C 33/36
[52] U.S. Cl. .................................. 384/618; 384/571
[58] Field of Search ........ 384/571, 561, 569, 618–622, 384/582, 447

[56] References Cited

U.S. PATENT DOCUMENTS

| | | | |
|---|---|---|---|
| 3,814,488 | 6/1974 | Rood | 384/619 X |
| 3,937,539 | 2/1976 | Jones et al. | 384/571 |
| 3,967,867 | 7/1976 | Richardson | 384/582 |
| 4,333,695 | 6/1982 | Evans | 384/571 X |

Primary Examiner—Thomas R. Hannon
Attorney, Agent, or Firm—Eugene E. Renz, Jr.

[57] ABSTRACT

A center-free rolling bearing assembly for machine tools comprising a disk-shaped outer ring, two adjacent outer raceways on the inner radial edge of the outer ring which converge conically together in an axially and radially inward direction, an inner ring, two conical inner raceways on the lateral surface of the inner ring, one in parallel with each outer raceway, and a row of cylindrical rolling elements between each outer raceway-inner raceway combination. The rolling elements of each row are guided laterally by the side surfaces of inner and outer guide flanges forming a single piece with the inner ring. The outer raceways form a single piece with the outer ring and the inner raceway form a single piece with the inner ring. At least one of the two outer guide flanges are formed by an outer flange ring which can be fixed in place on a seating section of the lateral surface of the inner ring, so that the rolling elements can be installed between the two outer and inner raceways.

10 Claims, 2 Drawing Sheets

CENTER-FREE ROLLER BEARING

FIELD OF THE INVENTION

The present invention relates to center-free rolling bearings particularly adapted for use in machine tools.

BACKGROUND OF THE INVENTION

In prior known rolling bearings of this general type, one of the rings is comprised of several ring segments which carry the raceways. After the rolling elements have been inserted in place, the ring elements are secured together by means of threaded bolts or the like about the periphery of the segments. These ring segments have to be produced and fitted separately which means that manufacture of bearings of this type is relatively complicated and expensive. Furthermore, as a practice matter, it is often impossible to obtain the precise running behavior necessary for use in the rolling bearing in machine tools because of the unavoidable production tolerance differentials in the assembled ring elements. Additionally, the rigidity and stiffness of the known roller bearing leaves something to be desired in applications where the bearing is subjected to off-center or eccentric loads.

SUMMARY OF THE INVENTION

With the foregoing in mind, it is an object of the present invention to provide a rolling bearing having novel features of construction and arrangement producing good running precision and high stiffness notwithstanding its center-free characteristic. The bearing of the present invention is also capable of being produced very economically.

By reason of the unique way in which the rolling bearing of accordance with the present invention is designed, the raceways of the one-piece outer ring and one-piece inner ring can be finished in a single set up. In this fashion, the pairs of inner and outer raceways of the inner and outer ring respectively have extremely great precision and form and, accordingly, the rollers run with relatively high precision. Furthermore, the bearing is exceptionally stiff since the bearing loads are transmitted across a stiff outer ring and inner ring to the accessory and support elements of the rolling bearing. In accordance with the present invention, the rollers may be easily inserted between the raceways and, when in place, a flange ring is fixed in place on one of the rings by means, for example, of a press fit to hold the rollers in place between the raceways. The assembled bearing thus forms a self-contained structural unit. In accordance with the principal embodiment of the invention, the seating section of the inner ring and the bore surface of the outer flange ring when fixed in place thereon form a smooth, continuous cylindrical surface. In this manner, the axial position of the outer flange ring on the inner ring can be adjusted. More specifically, the side surface of the outer flange ring which guides the rolling elements can be snugged up to the desired degree against the rolling elements of the adjacent row.

In accordance with another feature of the present invention, at least one of the two inner guide flange forms a single unitary piece with the integral ring. By this construction, the two inner raceways and the side surface of the inner flange rings can be finish ground in a single set up of the inner ring and the machine tool. Consequently, the side surfaces are positioned with extreme precision with respect to the adjacent inner raceway.

In accordance with still another feature of the present invention, at least one of the two inner guide flanges is formed by an inner flange ring having a bore surface which is supported radially on a support section of the lateral surface of the inner ring. In accordance with this modified embodiment of the present invention, the inner ring guide flange can be produced as a loose inner ring flange ring. Thus, the inner raceway adjacent to the inner flange ring can be finish ground with a grinding wheel which can be moved laterally inwardly and in this manner, allow the wheel to spark out as it is moved inwardly.

In accordance with another feature of the present invention, the inner flange ring has at least one slot at a predetermined point on its periphery to permit expansion of the bore to the largest diameter of the seating section of the lateral surface of the inner ring. By this arrangement, the loose inner flange ring can be expanded elastically and pushed axially over the seating section of the inner ring and brought up between the two inner raceways. The slot in the inner flange ring can be formed by splitting the finished hardened inner flange ring of roller bearing steel.

In accordance with still another feature of the present invention, the inner ring flange is free to slide on the support section of the lateral surface of the inner ring and the inner ring is provided with elastic means between the rows of rolling elements to force the inner ring flange axially outwardly. By this arrangement, the side surface of the inner ring flange will always rest free of play against the opposite inner side surface of the rolling elements.

In accordance with still another feature of the present invention, the elastic means forces the inner ring flange rings axially outwardly away from one another and the inner end surfaces of the flange rings form the boundaries of a radially inwardly tapering ring-shaped gap on the inner ring. A round cord ring exerting radially inwardly directed tension on the two end surfaces is installed in the ring-shaped gap as the elastic means. This provides a relatively simple and economical elastic means to force the inner ring flange rings radially inwardly and axially outwardly away from one another.

In accordance with the present invention, the support section of the lateral surface of the inner ring is formed by a flat conical section which defines a stepless inward extension of the conical inner raceway and which is the same cone angle as the inner raceway. This design provides a way of centering the inner flange ring on the support section of the inner ring with great accuracy.

The bore surface of each inner flange ring is fitted to the flat conical section of the inner ring and the inner end surface of inner flange ring is also conical wherein the cone angle of the end surface is larger than the cone angle of the inner raceway of the inner ring. Accordingly, in the case of an inner ring flange with multiple slots and with several ring segments about the periphery, the axial force components exerted by the round cord ring on the inner flange ring are greater than the forces of axial reaction exerted by the extended conical raceway section on the same inner flange ring. In this way, the inner flange ring is always tightened by the round cord ring radially outwardly against the opposite inner end surface of the rolling elements.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
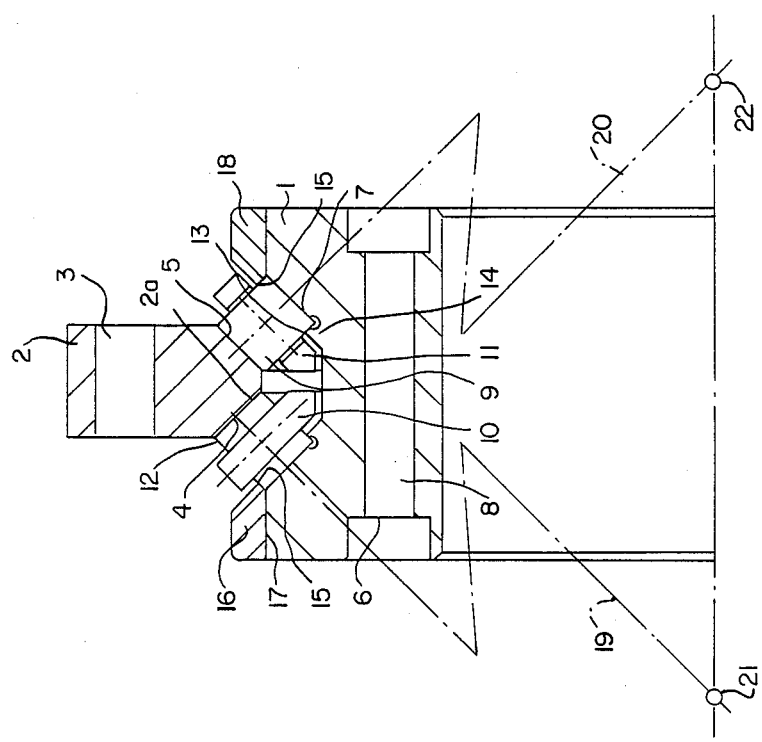
FIG. 1 is a partial longitudinal sectional view through a center-free rolling bearing made in accordance with the present invention.

Referring now to the drawings and particularly to FIG. 1 thereof, there is illustrated a center-free rolling bearing in accordance with the present invention comprising an inner ring 1 and an outer ring 2. This bearing can be used to support the turn tables of a machine tool and in the present instance, the roller bearing is laterally symmetric.

Outer ring 2 is disk-shaped and is provided with cylindrical axial through holes 3 adjacent its radially outward edge to accommodate fastening screws. At its radially inner edge 2a, the outer ring has 2 adjacent outer raceways 4 and 5 which converge axially and radially inwardly from both sides. Each of these outer raceways 4 and 5 forms a conical edge reduction on the radially inward edge 2a of the outer ring 2 and, thus, forms a single unitary piece with the outer ring 2.

The inner ring 1 has on its lateral surface two conical inner raceways 6 and 7 which, as illustrated, are parallel to the outer raceways 4 and 5 which form a single piece with the inner ring. Inner ring 1 has an axial through hole 8 adjacent its bore through which threaded bolts can be inserted to fasten an inner ring 1 to support elements or the like on a machine tool (not shown). As illustrated, the assembly includes side-by-side rows of cylindrical rolling elements 9 which engage between each outer raceway 4 and 5 and the associated inner raceways 6 and 7. The rolling elements 9 are guided in the pockets of a cage 10 consisting of ring segments. Each rolling element, as illustrated, has a flat inwardly directed inner end surface 11 and a flat outwardly directed outer end surface 12. The rolling elements 9 of each row are guided laterally by their inner end surfaces 11 on an inner side surface 13 of an inner guide flange 14 forming a single piece with the inner ring 1.

The rolling elements of each row are guided laterally on an outer side surface 15 of an outer guide flange at their outer end surfaces 12. The guide flange is designed as a loose outer flange ring 16. Outer flange ring 16 has a cylindrical bore surface 17 and is adapted to be fixed in place on a seating section defined by the lateral surface 18 of the inner ring 1. In the present instance, both seating section 18 and bore surface 17 of outer flange ring 16 are cylindrical without steps. Outer flange ring 16 is press fitted onto seating section 18 of the inner ring 1. The rolling elements 9 have center lines of pressure 19 and 20 which intersect at a pressure center 21, 22 on the axis of rotation A—A of the rolling bearing and form an angle of 45° with axis A—A.

Figure 2:
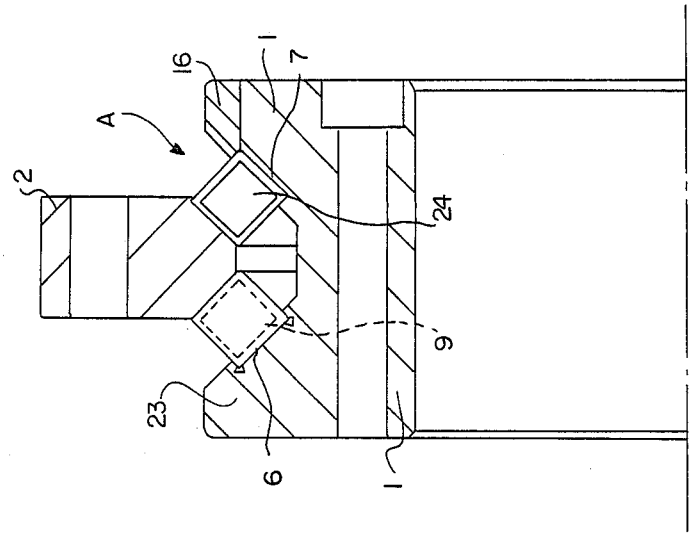
FIG. 2 is a partial longitudinal sectional view through a modified form of center-free rolling bearing with an outer flange ring.
Figure 3:
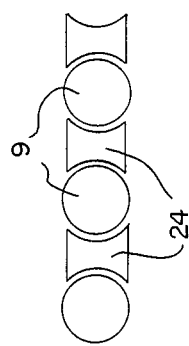
FIG. 3 is a partial top plan view as viewed in the direction of the arrow in FIG. 2 but excluding the inner and outer ring.

There is illustrated in FIG. 2 a modified rolling bearing in accordance with the present invention wherein the guide flange 23 forms a single piece with the inner ring as viewed in the left portion of the drawing in FIG. 2. In contrast, guide flange 16 is designed exactly as in the above embodiment and is press fitted onto the seating section 18 of the lateral surface 1b of the inner ring 1. Cylindrical rolling elements 9 of each row are maintained in spaced relation around the periphery by means of spacers 24 as best shown in FIG. 3.

Figure 4:
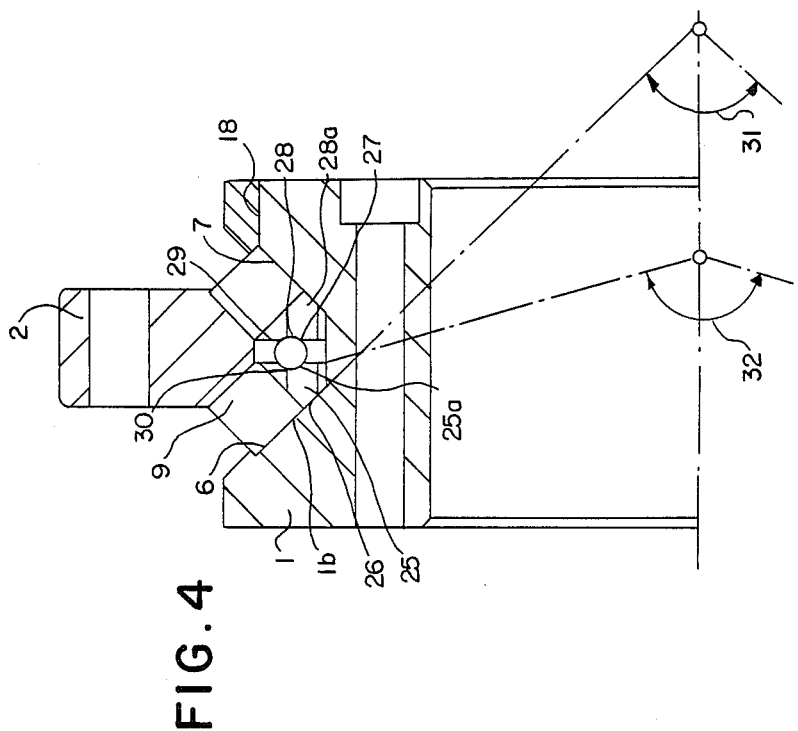
FIG. 4 is a partial longitudinal sectional view showing an additional modified embodiment of center-free rolling bearing with an outer flange ring in accordance with the present invention.

FIG. 4 shows an additional modification of the rolling bearing assembly in acordance with the present invention. In accordance with this embodiment of the invention, both inner guide flanges are formed by loose inner flange rings 25 which can be made, for example, of plastic or spring steel. The flange rings 25 have a continuous through slot 25a at a central point on its periphery. Inner flange ring 25 has a conical bore surface 26 by which it is supported radially on a conical support section 27 of the lateral surface 1b of the inner ring 1.

Each inner flange ring 25 can be elastically or plastically deformed, so that it can be explained in its bore to match at least the diameter of seating section 18. The inner flange ring 25 is free to slide on support section 27. Inner ring 1 carries elastic means, which are located between the two rows of rolling elements 9 and which force the two inner flange rings 25 axially outward away from each other. In the present case, the elastic means are formed by a round core ring 28 of rubber, into which a ring-shaped spring 28a is vulcanized. Each of the two inner flange rings 25 has an inner end surface 29. These two end surfaces 29 form the boundaries of a radially inward converging, ring-shaped gap 30 on inner ring 1.

To assemble the roller bearing, round cord ring 28 is expanded and pushed axially inward over seating section 18 until it snaps into ring-shaped gap 30. Round core ring 28 then exerts tension radially inward against the two end surfaces 29 and presses the two inner flange rings 25 axially outward.

Support section 27 of inner ring 1 is formed by a flat section on the lateral surface of inner ring 1, which extends the associated conical inner raceway 6, 7 inward in a stepless manner and which has a conical shape with exactly the same cone angle 31 as that of inner raceway 6, 7.

Bore surface 26 of each inner flange ring 25 is fitted conically with exactly the same cone angle 31 to the flat section of inner ring 1. Inner end surface 29 of each inner flange ring 25 is also conical. Cone angle 32 of each end surface 29 is larger than cone angle 31 of the inner raceway.

While particular embodiments of the present invention have been illustrated and described herein, it is not intended to limit the invention and changes and modifications may be made therein within the scope of the following claims.

For example, the two guide flanges do not both have to be designed as loose inner flange rings. Instead, one of the two inner flange rings can form a single piece with the inner ring, while the other is formed by an inner flange ring, a guide surface of which is supported radially on a support section of the lateral surface of the inner ring.

In place of the round cord ring, other elastic means such as a slotted spring ring can be provided to press against the inner end surface(s) of the inner flange ring(s).

The inner flange ring can also have continuous slots at various points around its periphery. In this case, the individual ring segments of the inner flange ring are pressed radially inward by the round cord ring, spring ring, etc., which engages in the ring-shaped gap between the two inner flange rings and are thus held in place on their support section on the lateral surface of the inner ring.

What is claimed is:

1. Center-free rolling bearing assembly for machine tools comprising a disk-shaped outer ring, two adjacent outer raceways on an inner radial edge of said outer ring which converge conically together in an axially and radially inward direction, an inner ring, two conical inner raceways on a lateral surface of the inner ring, parallel to said outer raceways, a row of cylindrical rolling elements between each outer raceway-inner raceway combination, inner and outer guide flanges for guiding the rolling elements of each row, the outer raceways (4, 5) forming a single piece with the outer ring (2) and the inner raceways (6, 7) forming a single piece with the inner ring (1), at least one of the outer guide flanges being formed by an outer flange ring (16) which can be fixed in place on a seating section (18) of the lateral surface of the inner ring so that the rolling elements (9) can be installed between the inner and outer raceways.

2. Rolling bearing assembly according to claim 1, including a pair of inner guide flanges (23) and wherein at least one of the two inner guide flanges (23) forms a single piece with the inner ring (1).

3. Rolling bearing assembly according to claim 1, wherein the seating section (18) of the inner ring (1) and a bore surface (17) of the outer flange ring (16) fixed in place thereon form a smooth, continuous cylindrical surface.

4. Rolling bearing assembly according to claim 3 including at least two inner guide flanges and, wherein at least one of the two inner guide flanges is formed by an inner flange ring (25), the bore surface (26) of which is supported radially on a support section (27) of the lateral surface of the inner ring.

5. Rolling bearing assembly according to claim 4, wherein the inner flange ring (25) has at least one complete slot at a certain point on its periphery so that its bore can be expanded to the largest diameter of the seating section (18) of the lateral surface of the inner ring (1).

6. Rolling bearing assembly according to claim 4, wherein the inner flange ring (25) is free to slide on the support section (27) of the lateral surface of the inner ring (1) and in that the inner ring (1) carries elastic means (28) between the two rows of rolling elements (9) to force the inner flange ring (25) axially outward.

7. Rolling bearing assembly according to claim 6, wherein the inner end surfaces (29) of the two inner flange rings (25) form the boundaries of a radially inward-tapering, ring-shaped gap (30) on the inner ring (1) and in that a round cord ring (28), which exerts radially inward-directed tension on the two end surfaces (29), is installed in this ring-shaped gap (30) as the elastic means.

8. Rolling bearing assembly according to claim 7, wherein the support section (27) of the lateral surface of the inner ring (1) is formed by a flat, conical section (27), which represents a stepless, inward extension of the associated conical inner raceway (6, 7) and which has the same cone angle (31) as the inner raceway (6, 7).

9. Rolling bearing assembly according to claim 8, wherein the bore surface (26) of each inner flange ring (25) is fitted to the flat, conical section (27) of the inner ring (1) and in that the inner end surface (29) of the inner flange ring (25) is also conical, the cone angle (32) of the end surface (29) being larger than the cone angle (31) of the adjacent inner raceway (6, 7) of the inner ring (1).

10. Rolling bearing assembly according to claim 1, wherein the roller bearing is laterally symmetric.

* * * * *